United States Patent [19]

Szabo

[11] Patent Number: 5,425,556
[45] Date of Patent: Jun. 20, 1995

[54] POP TOP INSERTION INDICATOR FOR THIN WALLED CONNECTORS

[75] Inventor: George Szabo, Ortonville, Mich.

[73] Assignee: ITT Corporation, New York, N.Y.

[21] Appl. No.: 126,280

[22] Filed: Sep. 24, 1993

[51] Int. Cl.⁶ ............................................. F16L 35/00
[52] U.S. Cl. .......................................... 285/4; 285/93; 285/319; 285/921
[58] Field of Search .................. 285/3, 4, 93, 319, 921

[56] References Cited

U.S. PATENT DOCUMENTS

| | | | |
|---|---|---|---|
| 1,692,710 | 11/1928 | Spahn | 285/3 X |
| 3,285,627 | 11/1966 | Kozulla et al. | 285/3 |
| 3,796,445 | 3/1974 | Strott | 285/4 |
| 4,244,608 | 1/1981 | Stuemky . | |
| 4,753,458 | 6/1988 | Case et al. | 285/93 |
| 4,756,558 | 7/1988 | Beamer . | |
| 4,783,101 | 11/1988 | Peterson et al. . | |
| 4,793,637 | 12/1988 | Laipply . | |
| 4,846,506 | 7/1989 | Boeson et al. | 285/319 X |
| 4,895,396 | 1/1990 | Washizu | 285/93 |
| 4,913,467 | 4/1990 | Washizu | 285/93 |
| 4,915,420 | 4/1990 | Washizu . | |
| 4,919,457 | 4/1990 | Moretti . | |
| 4,925,217 | 5/1990 | Ketcham . | |
| 4,946,205 | 8/1990 | Washizu . | |
| 4,948,176 | 8/1990 | Bartholomew . | |
| 4,979,765 | 12/1990 | Bartholomew | 285/319 |
| 5,002,315 | 3/1991 | Bartholomew | 285/93 |
| 5,135,268 | 8/1992 | McNaughton et al. . | |
| 5,152,555 | 10/1992 | Szabo | 285/93 |
| 5,178,424 | 1/1993 | Klinger | 285/93 X |
| 5,226,230 | 7/1993 | Klinger . | |
| 5,226,679 | 7/1993 | Klinger | 285/93 |
| 5,228,728 | 7/1993 | McNaughton et al. | 285/319 |
| 5,297,818 | 3/1994 | Klinger | 285/93 |

FOREIGN PATENT DOCUMENTS

| | | |
|---|---|---|
| 0505930A3 | 9/1992 | European Pat. Off. . |
| 1477306 | 6/1977 | United Kingdom ............. 285/93 |
| 2216213A | 4/1989 | United Kingdom . |

Primary Examiner—Randolph A. Reese
Assistant Examiner—Heather Chun Shackelford
Attorney, Agent, or Firm—Dykema Gossett

[57] ABSTRACT

A quick connect pop top indicator for use with thin walled connectors includes a generally annular sleeve adapted to fit adjacent an opening on a thin walled tubing housing member. The sleeve nests an indicator member substantially within the cap and housing. The indicator includes a base member and axially extending leg members extending from the base and connected to a generally annular indicator member. Means are provided for separating the indicator member from the base and leg members upon proper coupling of the housing with a corresponding male member. Means are also provided on the sleeve and indicator for maintaining the sleeve and indicator in proper axial and circumferential alignment prior to proper coupling of the housing and male member.

23 Claims, 5 Drawing Sheets

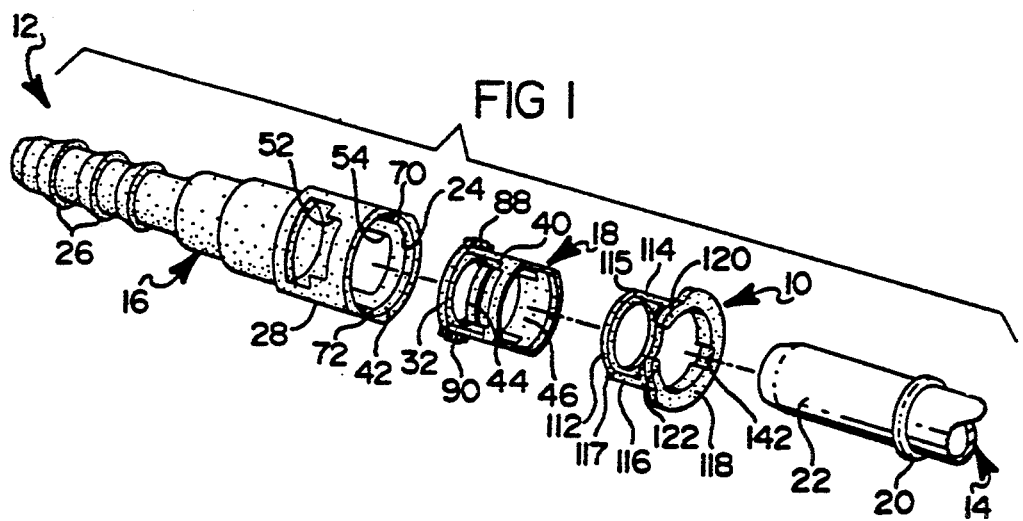
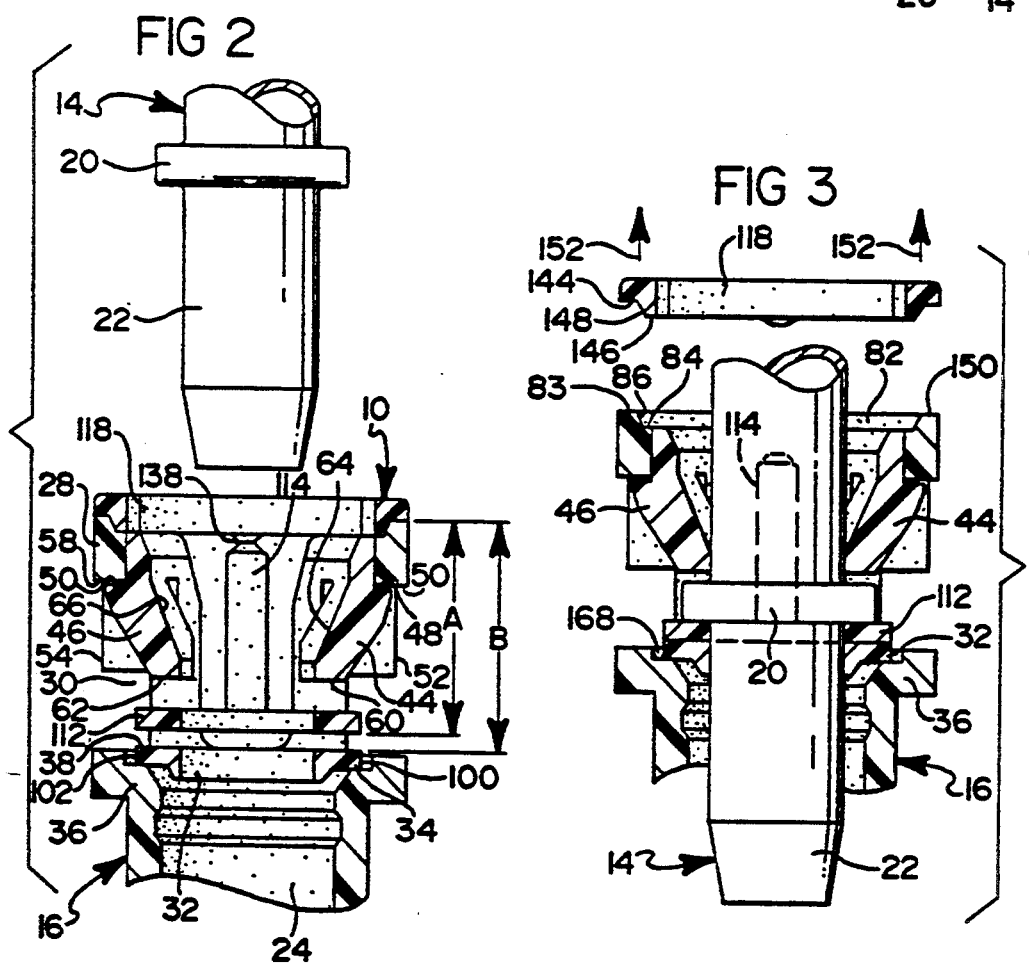

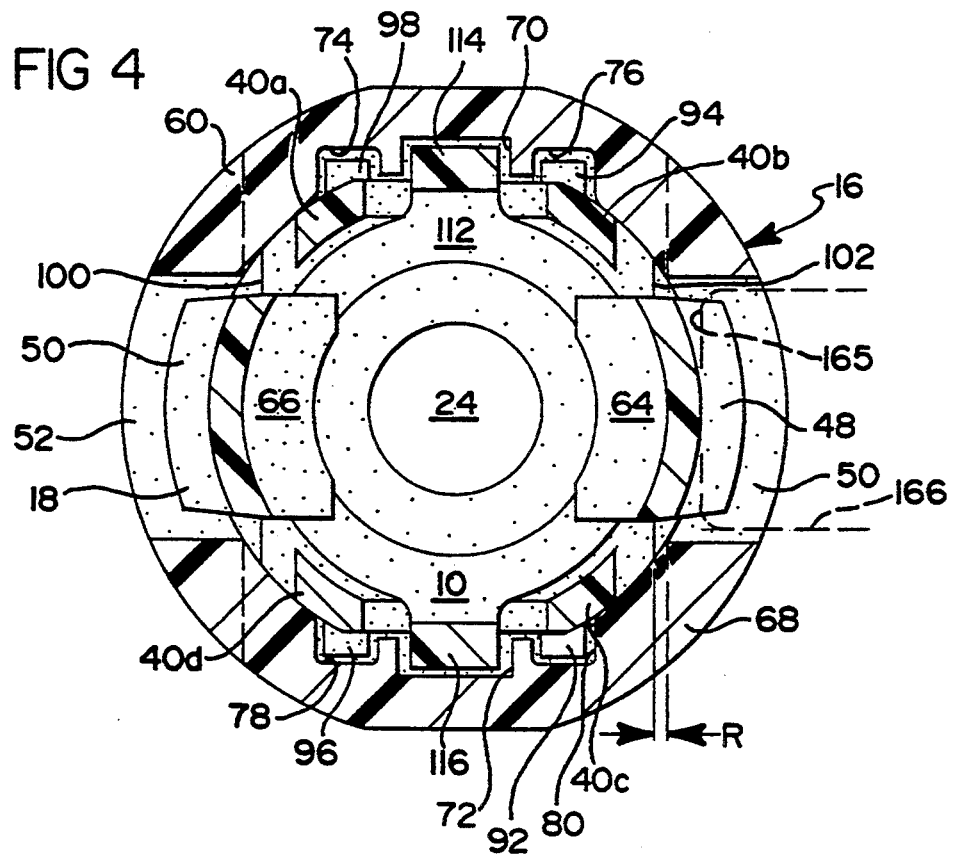
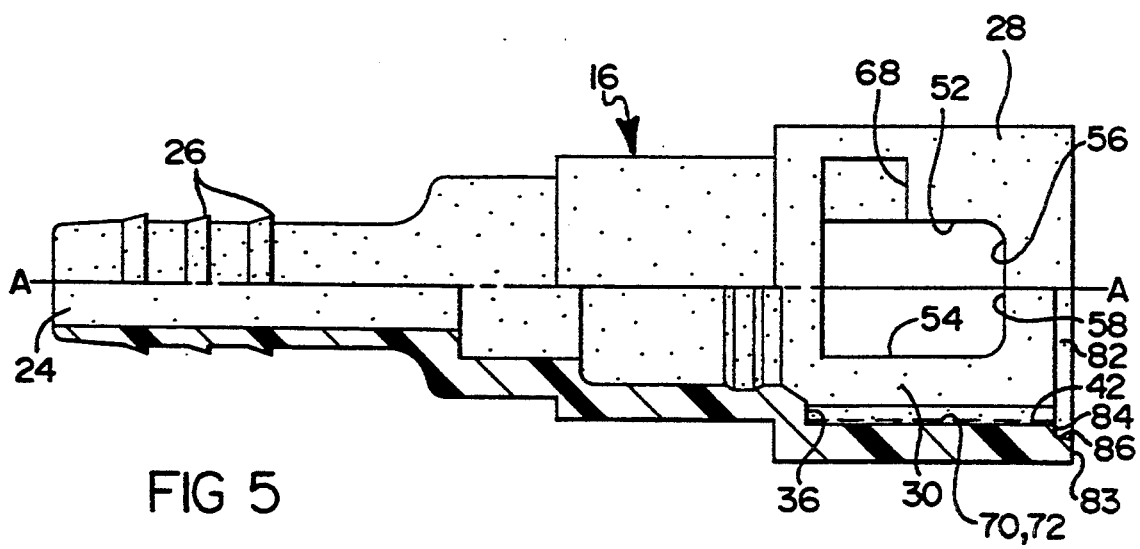

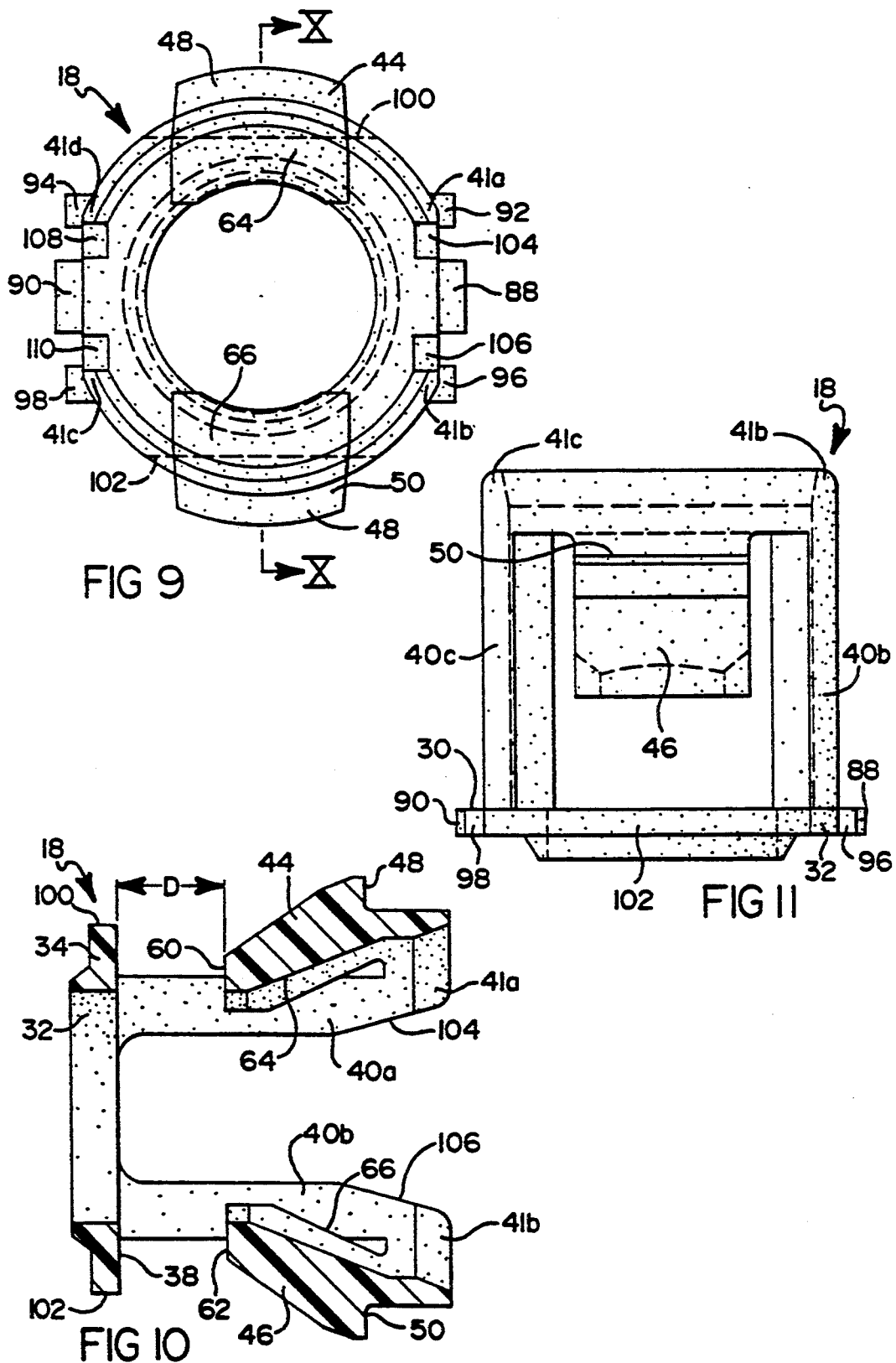

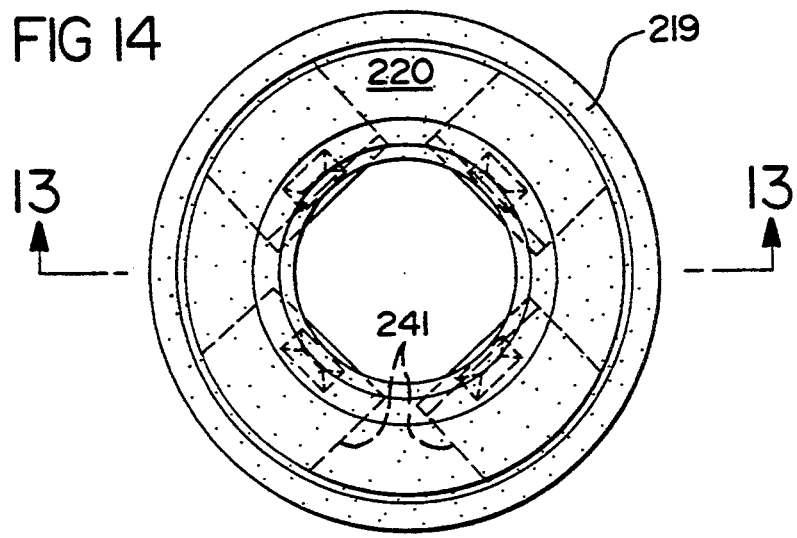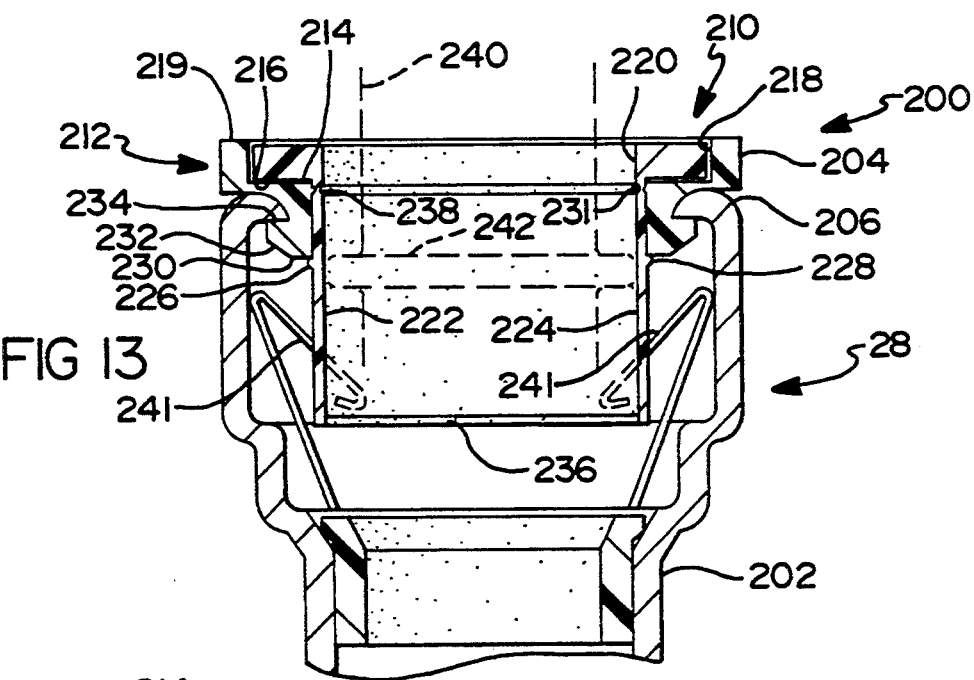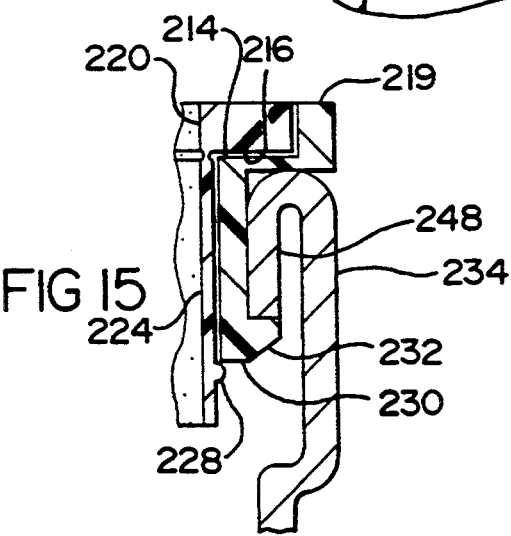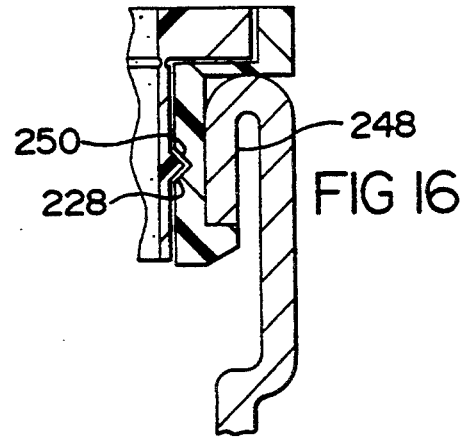

POP TOP INSERTION INDICATOR FOR THIN WALLED CONNECTORS

FIELD OF THE INVENTION

The present invention relates to quick connectors and, more particularly, to quick connectors having means enabling, by external inspection, determination of proper coupling between the male and female portions of the connector.

CROSS-REFERENCE

This invention is related to U.S. Pat. No. 5,297,818, issued Mar. 23, 1994, entitled "Retainer for Pop Top Indicator" having the same assignee of interest as this application. This invention is also related to U.S. Pat. No. 5,178,424, issued Jan. 12, 1993, entitled "Pop-Off Quick Connect Indicator" having the same inventor and assignee of interest as this application. U.S. Pat. No. 5,297,818 and U.S. Pat. No. 5,178,424 are hereby incorporated within this specification by reference.

BACKGROUND OFT HE INVENTION

It is desirable in fluid handling conduits to ensure that the connectors used have their male and female portions properly coupled together. A faulty connector enables an associated host system to leak fluid. This can be particularly disadvantageous when the system is under pressure and the leaking connector expels the pressurized fluid.

In the quick connector field, where male and female portions of the connectors are held together by friction locking members, it is important that the male and female portions be properly coupled. To ensure proper coupling, the installer may tug on or manipulate the connector to make sure that it is fully engaged. Also, visual types of inspecting devices enable the installer to confirm that the male and female portions are properly coupled together from observation alone.

U.S. Pat. No. 4,925,217, issued to Ketcham, discloses a quick connector with a visual checking feature wherein a deformable member is assembled within the fitting which includes elongated members extending out of the housing between the male and female portions prior to coupling and which are retracted, and no longer visible, once the coupling has been accomplished. Although this type of connector may work satisfactorily for its intended purpose, designers are always trying to improve the field. Furthermore, designs such as that employed by Ketcham provide only relatively small axial movement of the indicator member, which limits the reliability of the perceived indication when employed with relatively low cost, high tolerance manufacturing and, alternatively, adds additional expense to a more highly refined design. Lastly, the spring-like operation of Ketcham's vaulted annular member requires use of relatively expensive materials and can introduce additional failure modes, such as fracture of one of the legs which could interfere with proper coupling operation.

A related problem stems from concomitant aspects of commercially available quick connect devices, namely: high volume and low sale price frequently necessitating the use of inexpensive, somewhat pliable materials, and complex contours of extremely small inter-fitting components. These aspects collectively increase the likelihood of mis-assembly. High volume production techniques, including automated assembly tends to aggravate the problem wherein mis-assembly or impermissible dimensional variations of the components is difficult to detect.

SUMMARY OF THE INVENTION

Accordingly, it is an object of the present invention to provide a visual inspection device which enables, at a glance, the installer to ensure proper coupling of the connector. This invention also provides a visual inspection device adaptable to a variety of connectors. Also, the present invention provides the art with a simple, inexpensive inspection device that overcomes the shortcomings of previous devices described above.

The inventive quick connector includes a generally cylindrical connector housing defining an axial opening for matingly receiving a male member. Retainer means disposed substantially within the housing releasably interconnects the connector housing and male member. An insertion indicator also disposed partially within the housing is displaced axially upon interconnection of the connector housing and male member to provide a visual indication of the interconnection. Finally, index means axially and rotationally fix the insertion indicator relative to the connector housing. This arrangement has the advantage of permitting high speed automated pre-assembly of the female portion of the quick connector while ensuring against mis-alignment or mis-assembly thereof and eliminates the need for external alignment members.

In a broad sense, a quick connect insertion indicator designed in accordance with this invention includes a base member of generally annular configuration which is adapted for positioning about a male conduit within the connector housing. Two or more leg members extend axially from the base member and terminate near the opening. A generally annular indicator member which is positioned substantially adjacent to the opening is releasably engaged with the leg member terminations. Finally, means are provided operative to axially displace the base member upon engagement of the conduit and connector housing to effect separation of the base and indicator member. Guide means provide concentric positioning of the indicator member with the housing opening until coupling of the connector is complete.

In the preferred embodiment of the invention, the insertion indicator includes an annular base member and two circumferentially spaced axially elongated leg members dimensioned such that the leg members terminate internally adjacent a step formed at the axial housing opening. Guide means are provided to maintain concentric positioning of the indicator member as least partially within the housing opening, the base member defining an abutment surface disposed to engage a mating abutment surface defined by the conduit to axially displace the base and leg members upon engagement of the conduit and connector housing to effect simultaneous separation of the base and indicator members. This arrangement provides the advantage of minimizing the overall axial length of the quick connect fitting to enhance packaging thereof and avoids inadvertent release by requiring use of a special release tool.

According to another aspect of the invention, the insertion indicator defines axially elongated guide surfaces operative to engage axially elongated guide slots formed within an open sleeve that fits on the connector housing adjacent the opening to provide an axial freedom of relative displacement therebetween while prohibiting relative rotational displacement therebetween. This arrangement provides for precise positioning of the insertion indicator within the female housing to minimize the chance of mis-assembly or distortion of the components during coupling engagement. The slots and guide surfaces ensure that only desired relative axial displacement takes place during the engagement process and that rotation and skewing of the components will not occur.

According to another aspect of the invention, means for maintaining the indicator axially fixed relative to the female housing are provided. In the presently preferred embodiment, such means include radially extending projections formed on the axially elongated guide surfaces. The projections preferably cooperate with an abutment surface defined on the sleeve provided on the female housing. Such means ensure proper coupling engagement and proper indication by preventing undesirable axial movement between the housing and indicator while allowing the desirable axial displacement required upon proper coupling.

According to another aspect of the invention, a small arcuate sector of the indicator member is removed, or, alternately, a rupture point is provided therein, preferably in conjunction with a generally planar tab member which is integrally formed with and radially extending from the indicator member. This arrangement provides the advantages of ensuring retention of the indicator member upon the conduit after coupling has been accomplished and facilitating its removal, if required, thereafter.

According to still another feature of the invention, the base and leg members are formed integrally with the indicator member wherein either the indicator member or the leg members include predetermined weakened points, such as by reduced cross-sectional area that will simultaneously predictably fracture upon axial loading occasioned by coupling between the conduit and its mating connector housing.

These and other features and advantages of this invention will become apparent from the following specification which describes and discloses preferred and alternative embodiments of the invention in detail along with the drawings. The following being a brief description of the latter.

BRIEF DESCRIPTION OF THE DRAWINGS

FIG. 1, is a perspective exploded view of a conduit quick connect assembly embodying the present invention.

FIG. 2, is a broken, cross-sectional view, on an enlarged scale, of a de-mated connector housing and male conduit.

FIG. 3, represents the connector housing and male conduit of FIG. 2 in the coupled condition.

FIG. 4, is a cross-sectional view, on an enlarged scale, taken on lines IV—IV of FIG. 2.

FIG. 5, is a quarter cross-sectional view of the female housing of FIG. 2 taken from the top.

FIG. 9, is a top plan view of a retainer employed with the present invention.

FIG. 10, is a cross-sectional view taken on lines X—X of FIG. 9.

FIG. 11, is a front plan view of the retainer of FIG. 9.

FIG. 13, is a partial sectional view of a presently preferred embodiment of this invention as employed with a thin-walled connector.

FIG. 14, is a top plan view of the embodiment illustrated in FIG. 13.

FIG. 15 is a partial sectional view of a second preferred embodiment of this invention as employed with a modified thin-walled connector.

FIG. 16 is a partial sectional view of a second preferred embodiment of this invention as employed with a modified thin-walled connector.

DETAILED DESCRIPTION OF THE PREFERRED EMBODIMENTS

Figure 6:
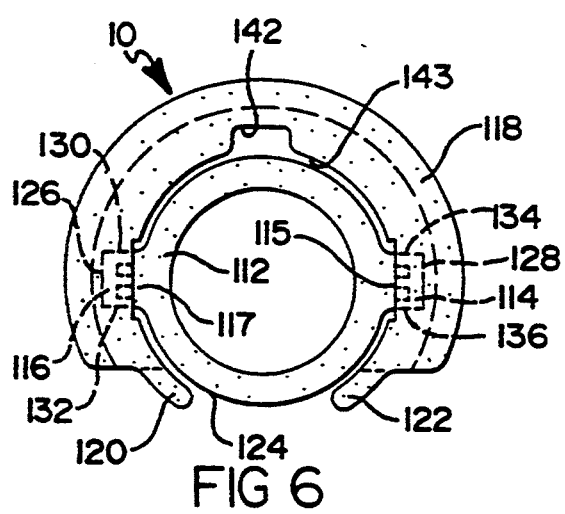
FIG. 6, is a top plan view of the preferred quick connect insertion indicator of the present invention.

Referring to FIG. 1, the present invention includes an insertion indicator device, shown generally at 10, for use with a quick connector, shown generally at 12, including male and female elements 14 and 16, respectively, and a locking member or retainer 18. With the exception of modifications described hereinbelow, quick connector 12 is representative of known commercially available devices. The quick connector 12 illustrated herein is adapted for application within systems employing tubular conduit, although it is contemplated that the present invention could be employed with other structural configurations and applications.

Male element 14 is illustrated as a thin wall metallic tube with an upset or external circumferential flange 20 integrally formed therein adjacent an open-end 22 adapted for insertion within a stepped through-passage 24 in female element 16. The end of female element 16 distal male element 14 has a series of external circumferential barbs 26 adapted for locking engagement with a resilient conduit (not illustrated). Locking member 18 is carried within an enlarged end 28 of female element 16 proximate male element 14 as will be described in greater detail hereinbelow.

As seen in FIG. 2, the through-passage 24 of female element 16 includes a stepped portion 30 within its enlarged end 28. Additional stepped portions may be provided to receive elements such as O-rings or the like (not illustrated) for sealing male element 14 within female element 16.

As best viewed in FIGS. 2 and 9–11, retainer 18 comprises a generally annular base portion 32 nestingly disposed concentrically within through-passage 24 terminating in a radially outwardly extending flange portion 34 received within a step 36 formed in female element 16 opening into stepped portion 30 and co-acting therewith to define a seat 38. Four (4) extensions 40a–d are integrally formed with base portion 32 and are circumferentially equally spaced thereabout and extend axially therefrom towards an opening 42 defined by the end of female element 16 for receiving male element 14. Locking member 18 defines two (2) inwardly directed male element engaging fingers 44, 46 depending from adjoining pairs of free ends (40a,d and 40b,c) of extensions 40. Fingers 44, 46 define radially outwardly directed abutment surfaces 48, 50 formed thereon which lockingly engage with one of a pair of opposed radial openings 52, 54 formed in female element 16. The uppermost (in FIG. 2), lateral surfaces of element 16 defining openings 52, 54 are designated as abutment surfaces 56, 58 which meetingly engage surfaces 48, 50 of retainer 18. The axially opposed ends of fingers 44, 46 define radially extending abutment surfaces 60, 62, which are, in assembly, axially spaced from seat 38 by a dimension "D" as will be described in detail hereinbelow. Fingers 44, 46 define radially inwardly tapered ramp surfaces 64, 66 extending through their axial length.

Both female element 16 and retainer 18 are made of injection molded plastic or other suitable material. Quarter cross-sections are employed in FIG. 5 for simplicity inasmuch as the structure is substantially symmetrical about the centerline axis A—A of female element 16. Lastly, certain interior components that typically would be employed with female element 16, such as sealing O-rings and spacers which normally would be disposed within through-passage 24, are deleted here for the sake of brevity.

Aligned pairs of tangential slots 68 formed in the outer surface of female element 16 open into radial openings 52, 54 as is described in co-pending application United States Ser. No. 07/675,374, filed Mar. 16, 1991, entitled "Quick Connect Insertion Indicator Clip", assigned to the same assignee of interest, which is incorporated herein by reference.

Referring to FIG. 4 and 5, stepped portion 30 of female element 16 has complementary circumferentially opposed axially elongated guide grooves 70, 72 formed in the inner-diameter surface of end 28 and opening into through-passage 24. Grooves 70, 72 are rotationally positioned approximately 90 degrees offset from radial openings 52, 54. Laterally opposed side grooves 74, 76 straddle groove 70, extending axially through stepped portion 30 and opening into through-passage 24. Likewise, side grooves 78, 80 are axially parallel to and straddle groove 72 and open radially into through-passage 24.

Opening 42 defines a stepped annular groove 82 composed of an axial outwardly facing abutment surface 84 and radially outwardly diverging alignment surface 86.

Referring to FIGS. 9 through 11, the structural details of retainer 18 are illustrated. Indexing tabs 88, 90 integrally formed with flange portion 34 of base portion 32 extend radially outwardly therefrom and are dimensioned to slip-fit within guide grooves 70, 72. Likewise, laterally spaced tangential indexing tabs 92, 94, 96, and 98, extend radially outwardly generally parallel to tabs 88, 90. Tabs 92 through 98 are, likewise, dimensioned to fit within their respective grooves 74 through 80. Flats or reliefs 100, 102 are formed in the circumferential wall of flange 34 in locations 90 degrees tangentially offset from tabs 88, 90 and are spaced radially inwardly of the inside diameter surface portion of end 28 which defines radial openings 52, 54 to ensure that flange 34 does not interfere with the use of an O.D. release tool as it penetrates openings 52, 54 to effect release of retainer 18 from female element 16. As best depicted in FIGS. 2 and 4, an O.D. release tool 166 shown in FIG. 4 in phantom will radially depress fingers 44, 46 inwardly until the radially outermost edges of abutment surfaces 48, 50 are radially inwardly spaced from the innermost edges of abutment surfaces 56, 58 to effect release. Typical prior art retainers had a constant radius flange which could interfere with the axially innermost transverse surface 165 of tool 166 and prevent release. The local radial clearance 168 (designated R in FIG. 4) provided by flats 100, 102 allows removal of retainer 18 with tool 166 still in place. Ideally, the radially outer surfaces of flats 100, 102 are disposed substantially inwardly of the innermost radial edges of abutment surfaces 56, 58. A further understanding of the present invention's interrelationship with tool 166 can be gleaned from U.S. Pat. No. 5,226,230, entitled "Universal O.D. Release Tool" issued Jul. 13, 1993 and having the same assignee as the present invention. U.S. Pat. No. 5,226,230 is hereby incorporated by reference. Tapered clearance relief surfaces 104, 106, 108, and 110 are formed in extensions 40 to prevent binding between male element 14 and retainer 18 during release. Lastly, the overall axial length of extensions 40a–d is abbreviated whereby the free ends 41a–d thereof distal base portion 32 are dimensioned to terminate adjacent abutment surface 84 of female element 16.

Figure 8:
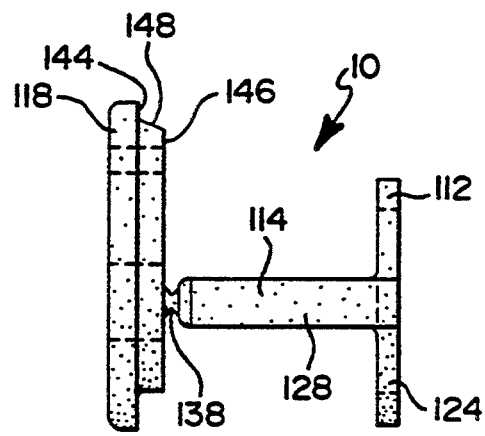
FIG. 8, is a side plan view of the insertion indicator of FIG. 6.
Figure 7:
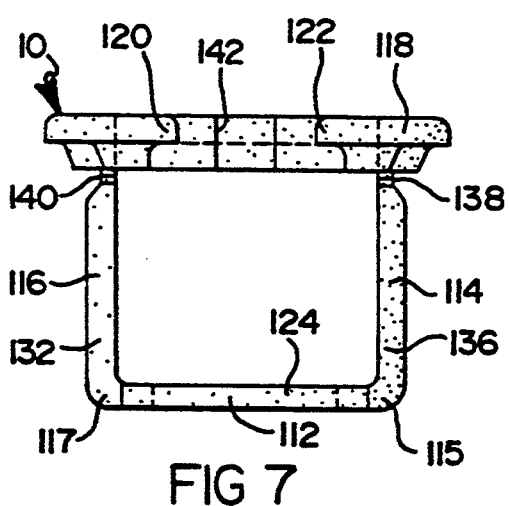
FIG. 7, is a front plan view of the insertion indicator of FIG. 6.

Referring to FIGS. 6 through 8, the structural details of inventive insertion indicator device 10 are illustrated. Indicator device 10 is constructed integrally from injection molded plastic or other suitable material and includes a generally annular base member 112, two circumferentially opposed axially elongated leg members 114, 116 and a generally annular indicator member 118. Base member 112 has a characteristic outside diameter equal to or slightly less than the lateral spacing of flats 100, 102 to prevent interference with surface 165 of tool 166. Indicator member 188 has an approximately 90 degree circumferential section removed, rendering it U shaped, and defining a permanent opening between circumferential fingers 120, 122 which are spaced approximately one half of the diameter of male element 14 to ensure that after coupling, indicator member 118 remains engaged with its associated male element 14 until it is intentionally removed therefrom. The radially innermost surfaces of leg members 114, 116, are tangentially integrally joined with necks 115, 117 formed on the outer diameter circumferential surface 124 of base member 112 and extend radially outwardly therefrom. Leg members 114, 116 are generally rectangular in cross-section and define opposed radially outwardly facing guide surfaces 126, 128, as well as opposed lateral guide surfaces 130 through 136. Each leg member 114, 116 extends from base member 112 to an opposed end which is integrally formed with indicator member 118. In the preferred embodiment, the point of interface between leg members 114, 116 and indicator member 118 forms a necked region 138, 140 which are dimensioned identically to ensure as close as possible equal pull-apart strength.

Indicator member 118 includes a generally rectangular recess 142 formed in the inner diameter surface 143 thereof. Indicator member 118 has a stepped typical cross-section defined by a rightwardly facing (as viewed in FIG. 8) radially outwardly extending circumferential abutment surface 144 and a right-hand most inner abutment surface 146 interconnected by a circumferential tapered fillet 148.

Quick connector 12 and indicator device 10 are provided with a system of guide surfaces which facilitates automated assembly and substantially reduces the likelihood of mis-assembly or component damage resulting from the assembly process. Grooves 70 through 80 interact with indexing, tabs 88 through 98 on retainer 18 as well as leg members 114, 116 of indicator device 10 to provide positive indexing therebetween to ensure against rotational mis-positioning. Multiple, laterally spaced sets of grooves 74, 70, 76 and 78, 72, 80 are provided to enhance the purchase of retainer 18 (via tabs 98, 90, 94 and 96, 88, 92, respectively) upon female element 16 to further reduce the likelihood of rotational mis-positioning by increasing the characteristic maximum chord dimension from the central axis. Because grooves 70 through 80 extend axially the entire length of end 22 of female element 16, they afford proper indexing of retainer 18 and indicator device 10 during the entire assembly process wherein retainer 18 and then indicator device 10 are sequentially axially inserted into female element 16 through opening 42. When fully inserted, base portion 32 of retainer 18 abuts step 36 of female element 16 and abutment surfaces 48, 50 of engaging fingers 44, 46 resiliently expand into radial openings 52, 54 to provide a lock-fit therebetween. Thereafter, as indicator device 10 is inserted, its base member 112 ramps axially along abutment surfaces 64, 66, momentarily resiliently displacing fingers 44, 46 radially outwardly until base member 12 is axially intermediate abutment surfaces 60, 62 and seat 8. Thus, indicator device 10 is positively retained within female element 16 by retainer element 18. Indicator device 10 insertion is complete when indicator member 118 surfaces 144, 146 and 148 abut female element 116 surfaces 83, 84 and 86, respectively. The radially extending surface of base member 112 facing abutment surfaces 60, 62, defines a seat for the leading edge of flange 120 of male element 14. It is thus, essential that dimension D as best seen in FIG. 2, provide for tolerance stack-up of axial dimension of flange 20, base member 112 and base portion 32.

Grooves 70, 72 are radially deep enough to substantially receive the section of leg members 112, 114 to ensure clearance for the insertion of male element 14 while maintaining axial freedom of movement of base member 112.

As best viewed in FIG. 2, indicator device 10 is illustrated in a first condition indicative of non-engagement between male and female elements 14 and 16. The leg members 114, 116 extend axially toward opening 42 to engage indicator member 118 such that abutment surface 144 of indicator member 118 abuts the upward most portion 83 (upward most as viewed in FIGS. 2 and 3) portion or transverse face 150 of female element 16. A substantial portion of indicator member 118 nests within groove 82 with abutment surface 146 abutting abutment surface 84 and alignment surface 86 following the contour of fillet 148 to effect a self-centering of indicator member 118 within opening 42.

Leg members 114, 116 are provided with a characteristic length which, in the pre-coupling condition illustrated in FIG. 2, suspends base member 112 axially from seat 38 of base portion 32 of retainer 18. Because surfaces 126 through 136 are in intimate sliding relationship with respect to grooves 170 through 180, base member 112 is secured from rotation or skewing prior to during and after the coupling process of quick connector 12.

Referring to FIGS. 2 and 3, during the mating process of connector 12, end portion 22 of male member 14 enters through-passage 24, passing through the inner-diameter of both indicator and base members 112 and 118 of indicator device 10 and base portion 32 of retainer 18. Flange 20 of male element 14 is dimensioned to axially ramp along surfaces 64, 66 of fingers 44, 46 until the trailing edge thereof passes abutment surfaces 60, 62, at which point fingers 44, 46 will resiliently snap radially inwardly to entrap flange 20 in its position as illustrated in FIG. 3. As the insertion process continues, the leading (lowermost) edge of abutment flange 20 contacts the upwardmost abutment surface of base member 112. Further downward displacement of male element 14 will carry base member 112 of insertion device 10 therewith. In so doing, leg members 114, 116 will be placed in tension, causing fracture thereof at neck regions 138, 140. Because indicator device 10 is positionally controlled during the coupling process, fracturing at neck regions 138, 140, is extremely predictable and takes place virtually simultaneously. This is in marked contrast to earlier designs in which one leg often would separate prior to the other causing the base member 112 to become distorted and possibly prevent full engagement of quick connector 12. Insertion is complete when the leading (lowermost) edge of base member 112, driven by circumferential flange 20, abuts seat 38. At this point, the trailing edge of flange 20 is passed downwardly past abutment surfaces 60, 62, of finger members 44, 46, which then snap radially inwardly, entrapping flange 20 as well as base member 112 of indicator device 10 in its designated installed position as illustrated in FIG. 3.

As shown in FIG. 2, the axial spacing (B-A) between the lowermost surface of base member 112 and the uppermost surface of seat 38 must be sufficient to accommodate a small degree of resiliency inherent in the material from which indicator device 10 is formed and ensure rupture at neck regions 138, 140. Upon such rupture, the tensional loading of leg members 114, 116 will cause a snap-back reaction as indicated by arrows 152, causing indicator member 118 to be actually ejected axially away from female element 16. Thereafter, it will be loosely retained on the portion of male element 14 leading away from the coupling in such a manner as to be clearly indicative of separation and thus a complete coupling has taken place. Alternately, indicator member 118 can be removed by grasping it about its peripheral surface and resiliently distorting fingers 120, 122 for removal from male element 14. Recess 142 has a secondary function in that it creates a weakened or hinge point to enhance removal of indicator 25 member 118 from male element 14.

Figure 12:
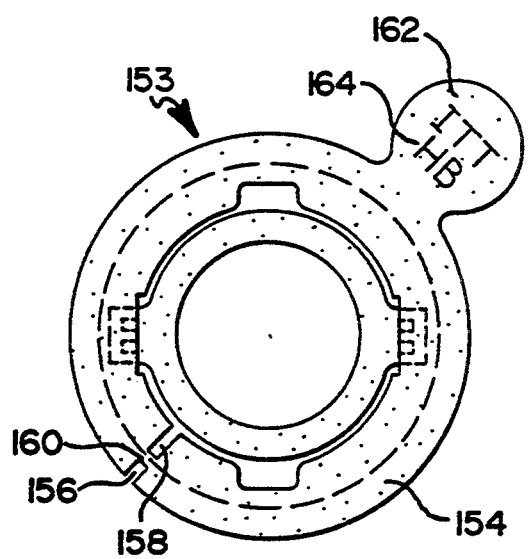
FIG. 12, is a top plan view of an alternative embodiment of the quick connect insertion indicator of the present invention.

Referring to FIG. 12, an alternative embodiment of an indicator device 156 is illustrated which differs only in that an associated indicator member 154 is completely annular and is contemplated for applications where it may be desirable to allow it to permanently encircle male element 14 throughout the life cycle of the fitting. Indicator member 154 is provided with radial slits 156, 158 with only a thin section of web 160 remaining therebetween. If removal is desired, indicator member 154 can be removed by gripping it manually or with a tool and pulling radially away from male element 14, rupturing web 160 in the process. Removal is further enhanced by a provision of a generally planer finger tab 162 extending radially therefrom which is integrally formed with indicator member 154 of indicator device 153 and optionally provided with instructional indicia 164. The remainder of the construction of indicator device 153 is as described with reference to the embodiment illustrated in detail in FIGS. 6 through 8.

Referring now to FIGS. 13 through 16, the presently preferred embodiment of this invention shall be described. FIGS. 13 and 14 illustrate an insertion indicator for thin-walled, metal tubing connectors at 200. Enlarged end 28 of female housing member 202 is appropriately fitted with sleeve 204 adjacent the transverse face 206 of female member 202. Indicator member 210 is appropriately positioned within cap 204 as shall be described in further detail below.

Thin-walled connector 202 is preferably metallic. U.S. Pat. No. 5,135,268, issued Aug. 4, 1992, describes several embodiments of a metallic female housing thin-walled connector. Thin-wall connector 202 is typical of the connectors described in U.S. Pat. No. 5,135,268 with the exceptions noted below and U.S. Pat. No. 5,135,268 is hereby incorporated by reference into this specification.

The inventive sleeve 204 makes indicator member 210 adaptable to thin-walled connectors. Sleeve 204 is preferably made of injection molded plastic or other suitable similar material. Indicator member 210 is preferably designed in accordance with the teachings noted above in reference to FIGS. 1–12. Some changes or additions are preferably made to indicator member 210 relative to indicator member 10 described above. Sleeve 204 provides the ability to nest indicator member 210 within the shoulder 212 defined within sleeve 204. Indicator member 210 is retained substantially within sleeve 204 and female housing member 202. Sleeve 204 includes bearing surface 214 which bears against abutment surface 216 defined on indicator member 210. Circumferential surface 218 within sleeve 204 has an inner diameter slightly greater than the outer diameter of the generally annular indicator 220. Surfaces 218 and 214 on sleeve 204 cooperate with the outer generally circumferential surface on indicator 220 and abutment surface 216 to effect self-centering and nesting of indicator 210 within sleeve 204 and female housing 202. The radial length of abutment surface 216 and bearing surface 214 are preferably long enough such that insertion of a male member into female housing 202 in accordance with the general teachings described above in relation to FIGS. 1–12 will not allow deformation of generally annular indicator 220 such that it protrudes inwardly into female housing element 202 but rather that proper insertion indication will be achieved as described generally above.

Indicator member 210 is designed as indicator member 10 described above in relation to FIGS. 1–12. An addition added in the preferred embodiment illustrated in FIGS. 13 through 16 includes radial projections 226 and 228 on leg members 222 and 224, respectively. Radial projections 226 and 228 cooperate with abutment surface 230 defined on sleeve 204 to maintain indicator member 210 axially fixed relative to sleeve 204 and housing member 202. Indicator member 210 is maintained rotationally fixed relative to sleeve 204 and housing member 202 because legs 222 and 224 are interdigitated with a retainer as described below. Alternatively, relative rotational movement is prohibited by inserting legs 222 and 224 into axially extending grooves 231 provided in one embodiment of sleeve 204 along the inner circumferential surface thereof. Such grooves in sleeve 204 serve the same rotationally fixing function as grooves 70 and 72 described previously.

Tapered lip 232 is provided adjacent abutment surface 230 to provide ease of attachment of sleeve 204 to female housing member 202. Sleeve 204 is preferably generally annular having a furthest outer diameter being the same as the furthest outer diameter of the enlarged end 28 of female housing member 202. By properly positioning sleeve 204 such that tapered lip 232 is facing the transverse face 206 on female member 202 and pressing inward (downward according to FIG. 13) such that tapered lip 232 rides along flange 234 until sleeve 204 is snapped or clicked or clipped into proper position at the end of female housing member 202. Insertion indicator 210 can then be applied to thin-walled connector 202 by manipulating indicator 210 into (downward according to the drawing) sleeve 204 and housing member 202 sufficiently until radially extending ribs 226 and 228 are properly engaged by abutment surface 230 and generally annular indicator 220 is properly nested within shoulder 212 such that bearing surface 214 is resting against abutment surface 216. In this configuration, as shown in FIG. 13, assembly 200 is properly configured and ready for insertion of a male member into thin-walled connector 202.

The insertion of a male member into thin-walled connector 202 within indicator 210 positioned as illustrated will result in an accurate indication of proper coupling between the male member and thin-walled connector 202 as generally annular indicator 220 will be axially separated from legs 222 and 224 and base to 236 of indicator member 210. Indicator member 210 is provided with necked regions 238 and 239 on legs 222 and 224, respectively, which are preferably dimensioned identically to insure as close as possible equal pull-apart strength. The manner of operation of indicator member 210 parallels that of indicator 10 as described above.

Thin-walled connector 202 is preferably provided with a stainless steel retainer 241 that serves as retaining means for retaining male connector member 240 (shown in phantom) within thin-walled connector 202. Proper insertion of male conduit 240 causes bead 242 to ramp along radially inwardly extending finger-like projections or retainer 241 until they snap radially inwardly to engage and bear against an upper (according to the drawing) surface on the bead 242 on male member 240 in a manner similar to that described above (FIGS. 2 and 3). Legs 222 and 224 on indicator 210 are placed between pairs of the finger-like projections on retainer 241. This interdigitation helps to prohibit relative rotational displacement between indicator 210 and housing 202.

FIGS. 15 and 16 show further embodiments of a thin-walled connector employing a modified version of the inventive sleeve 204. In FIGS. 15 and 16, flange 234 is provided by effectively bending over the edge of thin-walled connector 202 such that leg 248 protrudes inward into thin-walled connector 202 and runs generally parallel to the outer surface of the connector member. The extended length of leg 248 compared to the flange 234 provided in FIG. 13 provides added pull-out strength for maintaining sleeve 204 in proper engagement with thin-walled housing 202. The particular embodiment illustrated in FIG. 16 includes a leg 248 that is long enough such that sleeve 204 must be modified in order to properly retain insertion indicator 210 such that it is substantially disposed within sleeve 204 and female housing 202. The axial length of leg 248 and, therefore, sleeve 204 necessitates a recess 250 which is a generally radially defined groove or notch within the inner wall of sleeve 204 that cooperates with radially extending projections 226 and 228 on legs 222 and 224 of insertion indicator 210, respectively. In the particular embodiment illustrated in FIG. 16, it is especially advantageous to provide grooves in sleeve 204 for receiving legs 222 and 224.

It is also conceivable that legs 248 on thin-walled connector 202 will not be so long as to require a notch 250 to be formed within sleeve 204. Alternatively, and preferably, as illustrated in FIG. 15, leg 248 has an axial length that allows sleeve 204 to be provided such that radially extending projections or ribs 226 and 228 cooperate with an abutment surface 230. The operation of insertion indicator 210 relative to the embodiment illustrated in FIGS. 15 and 16 parallels that described above in relation to FIGS. 1–12 and 13–14 in order to ensure accurate indication of proper coupling between a male member and thin-walled connector 202.

It is to be understood that this invention has been described with reference to a specific embodiment and variations to provide the features and advantages previously described and that the embodiments are susceptible of modification as will become apparent to those skilled in the art. For example, it is contemplated that leg members 114, 116 could terminate in a snap-apart, reusable fitting such as described in U.S. Pat. No. 5,178,424. Accordingly, the foregoing is not to be construed in a limiting sense.

What is claimed is:

1. A quick connector, comprising:
    a generally cylindrical thin-walled tubing connector housing defining an axial opening for matingly receiving a male member;
    a sleeve disposed adjacent said opening; and
    an insertion indicator disposed partially within said housing and partially nested within said sleeve, said indicator being axially displaceable such that a first portion of said indicator is separated from a second indicator portion in response to a proper interconnection of said housing and male member to thereby visually indicate said interconnection.

2. The quick connector of claim 1, wherein said insertion indicator comprises:
    a base portion adapted for positioning within said housing;
    a plurality of circumferentially spaced, axially extending elongated leg members terminating internally adjacent said axial housing opening;
    an indicator portion disposed substantially within said sleeve releasably engaging said base portion through a connection to said leg member terminations; and
    guide means for maintaining concentric positioning of said indicator with said housing, said base portion defining an abutment surface disposed to engage a mating abutment surface defined by said male member to axially displace said base portion upon said interconnection of said male member and said housing to effect substantially simultaneous separation of said base and indicator portion.

3. The quick connector of claim 2, wherein said base portion and said leg members are integrally formed of injection molded plastic.

4. The quick connector of claim 2, wherein said base portion is generally annular and has an outside diameter dimensioned less than the inside diameter dimension of said housing opening and an inside diameter dimensioned slightly greater than the nominal outside diameter dimension of said male member and slightly less than the outside diameter dimension of said male member abutment surface.

5. The quick connector of claim 2, wherein said indicator portion is generally annular and has an inside diameter dimensioned slightly greater than the outside diameter dimension of said male member abutment surface.

6. The quick connector of claim 2, wherein said indicator portion is integrally formed with said base portion and leg members and said leg members include a predetermined weakened point operative to predictably fracture under axial loading to effect said separation.

7. The quick connector of claim 2, wherein said insertion indicator further comprises means for limiting relative axial movement between said housing and said indicator.

8. The quick connector of claim 7, wherein said limiting means cooperates with said sleeve to effect said limited relative movement.

9. The quick connector of claim 7, wherein said limiting means comprises radially extending projections defined on said legs of said indicator that cooperate with an abutment surface defined on said sleeve.

10. The quick connector of claim 1, wherein said sleeve is formed of plastic.

11. The quick connector of claim 1, wherein said sleeve has a first abutment surface defined at a first axial end of said sleeve, a second abutment surface disposed at a medial axial point of said sleeve for engaging a corresponding housing abutment surface disposed adjacent said housing opening, and a third abutment surface defined adjacent a second axial end of said sleeve.

12. The quick connector of claim 11, wherein said first abutment surface is disposed substantially within said housing and said third abutment surface is disposed outside said housing opening.

13. The quick connector of claim 11, wherein said sleeve further comprises an axially extending generally annular surface disposed adjacent said third abutment surface defining a shoulder.

14. The quick connector of claim 13, wherein said shoulder receives and nests said insertion indicator such that said indicator is disposed substantially within said sleeve.

15. A quick connector assembly, comprising:
    a male element;
    a female element having an opening adapted to receive said male element, said female element being made of a thin-walled tubing material and having a retainer disposed within said housing, said retainer having a plurality of generally axially extending and radially projecting finger members for maintaining said male element within said female element upon proper coupling of said elements;
    a sleeve disposed adjacent said opening for facilitating indication of proper coupling between said male and female elements; and
    an insertion indicator including a generally annular base member disposed about said male element within said female element and said sleeve, said insertion indicator further including a plurality of circumferentially spaced, axially extending elongated legs carried by said base member and terminating adjacent said opening, a generally annular indicator member disposed substantially within said sleeve releasably engaging said leg member terminations, and guide means operative to maintain concentric and axial positioning of said indicator substantially within said sleeve and partially within said female element, said base member defining an internal abutment surface disposed to engage an annular bead disposed on said male member to axially displace said base member upon proper coupling of said male and female elements to effect simultaneous separation of said base and indicator members.

16. The assembly of claim 15 wherein said finger members are equally circumferentially spaced and said legs are circumferentially interdigitated with said fingers.

17. The assembly of claim 15, wherein there are four finger members and two leg members.

18. The assembly of claim 15 wherein said sleeve and insertion indicator comprise cooperating axially elongated guide surfaces for prohibiting relative rotational displacement therebetween.

19. The assembly of claim 18, further comprising means for limiting relative axial displacement between said sleeve and said indicator.

20. The assembly of claim 19, wherein said means for limiting relative axial displacement comprises radially extending projections disposed on a guide surface on said indicator and an abutment surface defined on said sleeve, said projections abutting against said abutment surface.

21. The assembly of claim 15, wherein said generally annular indicator member is disposed substantially within a shoulder defined on said sleeve adjacent said opening in said female element prior to proper coupling of said male and female elements.

22. An insertion indicator, comprising:
a generally annular sleeve adapted to engage a thin-walled tubing female housing adjacent an opening on said housing adapted to receive a mating male member; and
an insertion indicator member including a base portion and axially extending elongated legs releasably coupling said base portion to an indicator, said legs defining guide surfaces that are received within axially extending guide slots on said sleeve, said guide slots and surfaces cooperating to prohibit relative rotational movement between said sleeve and indicator.

23. The insertion indicator of claim 22, wherein said indicator portion is disposed substantially within said sleeve.

* * * * *

UNITED STATES PATENT AND TRADEMARK OFFICE
CERTIFICATE OF CORRECTION

PATENT NO. : 5,425,556
DATED : June 20, 1995
INVENTOR(S) : Szabo

It is certified that error appears in the above-indentified patent and that said Letters Patent is hereby corrected as shown below:

In claim 22, line 20 of column 14 of the patent, after the word "indicator", insert --portion--.

Signed and Sealed this

Twenty-sixth Day of September, 1995

Attest:

BRUCE LEHMAN

Attesting Officer    Commissioner of Patents and Trademarks